(12) United States Patent
Pegg et al.

(10) Patent No.: US 9,471,596 B2
(45) Date of Patent: Oct. 18, 2016

(54) SYSTEMS AND METHODS FOR PROCESSING SEARCH QUERIES UTILIZING HIERARCHICALLY ORGANIZED DATA

(71) Applicant: MapQuest, Inc., Denver, CO (US)

(72) Inventors: Antony M. Pegg, East Petersburg, PA (US); Stephen K. Hess, Red Lion, PA (US); Kevin L. Mayhew, Red Lion, PA (US)

(73) Assignee: MapQuest, Inc., Denver, CO (US)

( * ) Notice: Subject to any disclaimer, the term of this patent is extended or adjusted under 35 U.S.C. 154(b) by 164 days.

(21) Appl. No.: 13/966,119

(22) Filed: Aug. 13, 2013

(65) Prior Publication Data

US 2015/0052124 A1 Feb. 19, 2015

(51) Int. Cl.
*G06F 17/30* (2006.01)

(52) U.S. Cl.
CPC ..... *G06F 17/30241* (2013.01); *G06F 17/3087* (2013.01); *G06F 17/30327* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,807,618 B1 * | 10/2004 | Kemeny | ............. | G06F 12/0871 711/118 |
| 8,438,166 B1 | 5/2013 | Treder | | |
| 8,484,199 B1 | 7/2013 | Katragadda | | |
| 2007/0005563 A1 * | 1/2007 | Aravamudan | ..... | H04N 21/4828 |
| 2011/0047139 A1 * | 2/2011 | Strope et al. | ................. | 707/706 |
| 2011/0246478 A1 * | 10/2011 | Deng | ................ | G06F 17/30241 707/743 |
| 2011/0254708 A1 * | 10/2011 | Anderson | .............. | B60Q 5/008 340/988 |
| 2011/0270884 A1 * | 11/2011 | Li | ..................... | G06F 17/30017 707/780 |

OTHER PUBLICATIONS

International Search Report, mailed on Nov. 14, 2014, for PCT Application No. PCT/US2014/049890 (3 pages).
Written Opinion of the International Searching Authority, mailed on Nov. 14, 2014, for PCT Application No. PCT/US2014/049890 (4 pages).
International Preliminary Report on Patentability. issued Feb. 16, 2016, for PCT Application No. PCT/US2014/049890 (5 pages).

* cited by examiner

*Primary Examiner* — Etienne Leroux
(74) *Attorney, Agent, or Firm* — Finnegan, Henderson, Farabow, Garrett & Dunner LLP

(57) ABSTRACT

Computerized systems and methods are provided for generating results of a search query. In accordance with some implementations, data is received that is indicative of a character string related to a location and provided as input by a user. One or more hierarchically organized data trees are retrieved, from a storage device, for administrative areas related to the input character. Thereafter, probable target addresses are determined for the location utilizing the hierarchically organized data trees for each of the administrative areas, and a list of probable target addresses is provided for display to the user based on the hierarchy of the administrative areas.

16 Claims, 6 Drawing Sheets

500

SYSTEMS AND METHODS FOR PROCESSING SEARCH QUERIES UTILIZING HIERARCHICALLY ORGANIZED DATA

BACKGROUND

1. Technical Field

The present disclosure relates to computerized data processing and search technologies. More particularly, and without limitation, the present disclosure relates to systems and methods for providing a list of probable target addresses using hierarchically organized data relating to geographic locations in response to input of a character string.

2. Background

Use of the Internet and mapping services has grown significantly in recent years. Internet access is now available from a variety of devices, such as personal computers, laptops, tablets, personal digital assistants (PDAs), mobile phones, smart-phones, televisions, and other devices. With the increased access to the Internet from a wide variety of devices, people have become more reliant than ever on online mapping services where they submit queries seeking desired location information and directions to various destinations.

Online web services offer a variety of different search engines for finding location information from a large pool of available information. Both generalized search engines and specialized search engines are available which provide mapping services. These mapping services may specifically be utilized for navigating a user to a location. For example, destination information may be searched for utilizing generalized web searches by utilizing Google™ and Bing™. Alternatively, specialized search engines are available for searching for geographic or map information such as Google Maps™ and Mapquest™.

There are a variety of different ways in which search engines allow users to enter queries regarding geographic locations. For example, some search engines provide a field for entering a search query in a natural language format, and analyze the query in an attempt to determine the user's meaning before conducting the search. Such an analysis may involve separating the query into words, and attempting to derive a context from the ordering of the words in the query. A database may then be parsed to determine all possible matches.

The prevalence of Internet access and the availability of a wide variety of online mapping services makes it easier for people to search for addresses and location information by parsing databases. Nevertheless, it can still be difficult for users to find desired location information without significant user intervention because, for example, there may be cities with the same or similar names in multiple states or in some cases there may be similar addresses present in multiple cities or regions. For example, most cites located in the United States contain a "Main Street." As a result, a user may enter a search query regarding location information only to find that the desired information is buried within the returned results. At that point, users often attempt to enter additional information and try again. Trying to decipher what details to enter in each refined search is a tedious process and takes away from the efficiency of quickly accessing the desired information. Furthermore, requiring a user to manually parse through all of the search results to determine the desired information is inefficient.

SUMMARY

Embodiments of the present disclosure provide improved systems and methods for displaying probable target addresses as each character of a query term is input. Embodiments of the present disclosure also encompass techniques to determine the order of administrative areas based on which the probable target addresses are displayed. The embodiments presented herein also address one or more of the disadvantages of conventional systems and methods, such as those highlighted above.

In accordance with the present disclosure, there is provided a computer-implemented method for generating results of a search query. The method comprises receiving data indicative of input of a character string related to a location and retrieving, from a storage device, hierarchical organized data trees of locations for administrative areas related to the input character string. The method also comprises detecting probable target addresses for the location using the hierarchically organized data trees for each of the administrative areas, determining a hierarchy of the administrative areas based on data related to a user, and providing a list of probable target addresses based on the hierarchy of the administrative areas to display on a device of the user.

Also, in accordance with the present disclosure, there is provided a computer system for generating results of a search query, comprising a memory device that stores a set of instructions and at least one processor that executes the set of instructions. The at least one processor, when executing the instructions, is configured to receive data indicative of input of a character string related to a location and retrieve hierarchically organized data trees of locations for administrative areas related to the input character string. The at least one processor, when executing the instructions, is also configured to detect probable target addresses for the location using the hierarchically organized data trees for each of the administrative areas, determine a hierarchy of the administrative areas based on data related to a user, and provide a list of probable target addresses based on the hierarchy of the administrative areas to display on a device of the user.

Further in accordance with the present disclosure, there is provided a non-transitory computer-readable medium stores a set of instructions that are executable by at least one processor to cause the at least one processor to carry out a method. The method comprises receiving data indicative of input of a character string related to a location and retrieving, from a storage device, hierarchically organized data trees of locations for administrative areas related to the input character string. The method also comprises detecting probable target addresses for the location using the hierarchically organized data trees for each of the administrative areas, determining a hierarchy of the administrative areas based on data related to a user, and providing a list of probable target addresses based on the hierarchy of the administrative areas to display on a device of the user.

Before explaining exemplary embodiments of the present disclosure in detail, it is to be understood that the disclosure is not limited in its application to the details of constructions and to the arrangements set forth in the following description or illustrated in the drawings. The disclosure is capable of embodiments in addition to those described and is capable of being practiced and carried out in various ways. Also, it is to be understood that the phraseology and terminology employed herein, as well as in the abstract, are for the purpose of description and should not be regarded as limiting.

The accompanying drawings, which are incorporated and constitute part of the specification, illustrate certain embodiments of the disclosure, and together with the description, serve to explain the principles of the disclosure.

As such, those skilled in the art will appreciate that the conception upon which this disclosure is based may readily be utilized as a basis for designing other structures, methods, and/or systems for carrying out the several purposes of the present disclosure. It is important, therefore, to recognize that the claims should be regarded as including such equivalent constructions insofar as they do not depart from the spirit and scope of the present disclosure.

DETAILED DESCRIPTION OF EXEMPLARY EMBODIMENTS

Figure 1:
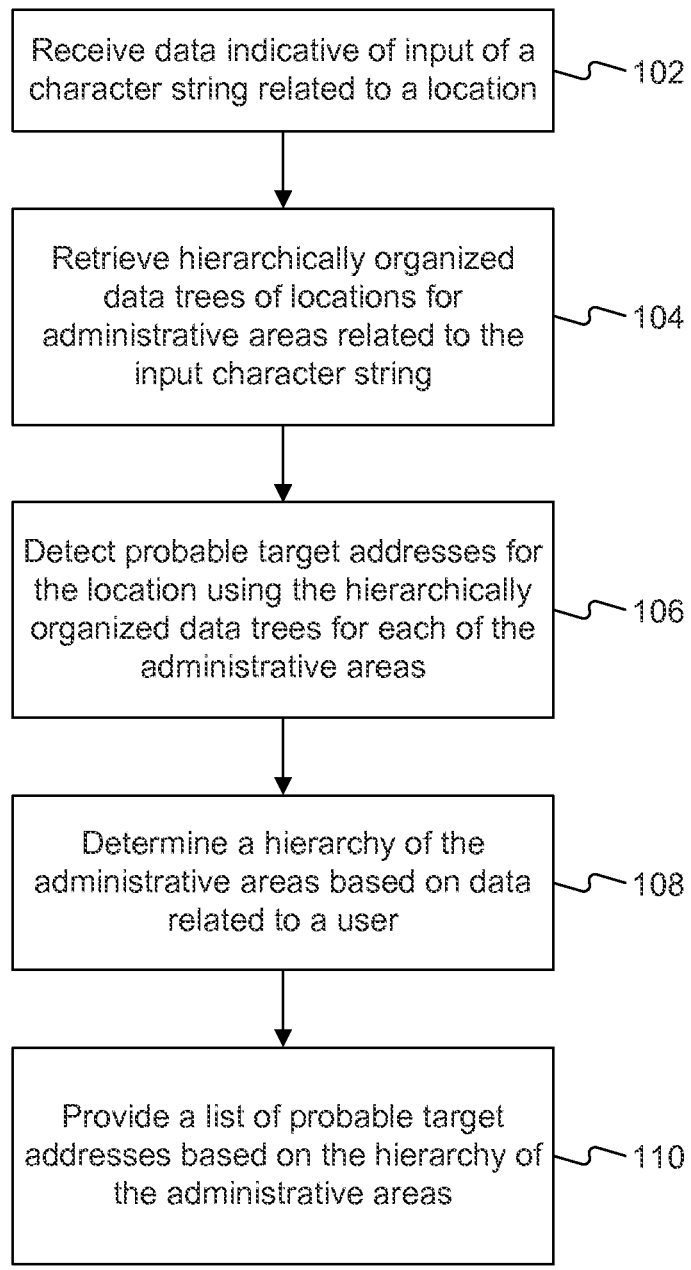
FIG. 1 illustrates an exemplary method for generating results based on a search query for a location, consistent with embodiments of the present disclosure.

Reference will now be made in detail to the present embodiments of the disclosure, certain examples of which are illustrated in the accompanying drawings.

In accordance with embodiments described herein, a mapping service or provider may utilize one or more web servers including a search engine for processing user search queries received over a network, such as the Internet. A search query may include one or more terms or phrases input by a user to search an available pool of location information organized in hierarchical data structures stored by the web server. The mapping service may use the hierarchically organized data structures to continually generate results comprising probable target addresses as each character of a character string is input. Probable target addresses, as discussed in further detail below with respect to the embodiment of FIG. 1, refer to names of specific geographic locations such as cities or states, as well as street addresses, etc. Accordingly, a list of probable target addresses is updated and refined in response to the input of each character of a character string utilizing the pre-stored hierarchically organized data structures.

A character string may include a sequence of characters. The sequence of characters may include one or more alphanumeric characters, accented characters, diacritics, spaces, character returns, punctuation, and/or any other character commonly entered by a user with a keyboard and/or provided for in a character-encoding scheme, such as American Standard Code for Information Interchange (ASCII) or UCS Transformation Format-8-bit (UTF-8). For example, a character string may include one or more words, phrases, abbreviations, or numbers.

In accordance with certain embodiments, all addresses and locations may be represented by nodes contained in hierarchically organized data structures. In such embodiments, the hierarchically organized data structures may be referred to as TRIEs, TRIE structures, or prefix trees. The utilization of hierarchically organized data structures may allow for quick searching of large amounts of data. It also enables quick deterministic future automation. For example, based on a particular set of characters representing a prefix entered by a user, a determination may be made regarding the possible characters that may complete the character string. In such cases, it may be determined that only a finite number of character combination in a hierarchically organized data structure may complete the character string. Accordingly, possible phrases (probable target addresses) which complete an inputted character string, based on a hierarchically organized data structure, may be quickly determined and displayed.

According to embodiments consistent with the present disclosure, different hierarchically organized data structures may be stored for each applicable administrative area. An administrative area may refer to a geographical designation, such as street names, neighborhood names, city names, county names, state names, provinces, or other suitable designations. For example, if there are no city names that start with the letter "X" but there are street names starting with the letter "X", then a hierarchically organized data structure with a first node corresponding to the letter "X" would be saved for the street names but no such hierarchically organized data structure would exist for city names. Accordingly, when a user enters a character string, probable target addresses based on the input character string are determined for only existing hierarchically organized data structures that correspond to the entered prefix. The order in which the probable target addresses are presented may be based on a determined hierarchy between any applicable administrative areas as explained in further detail below.

FIG. 1 illustrates an exemplary method 100 for generating results of a search query of geographical locations, consistent with embodiments of the present disclosure. In step 102, data is received that is indicative of input of a character string related to a location. The first character string may be a query related to a point of interest that a user may be searching for. The query string may be part of an address or a name of a location that a user enters in a search engine. Accordingly, as each character of the character string is entered in the user device, data related to the input of the character is received by a processor.

In other embodiments, a determination may be made that a user is inadvertently inputting incorrect characters for a character string. Accordingly, one or more prediction methods may be utilized to determine an intended character string. Therefore, in accordance with some embodiments, steps 104-110 that are described below may be processed using both the actual data string that is input and the determined intended data string.

Figure 2:
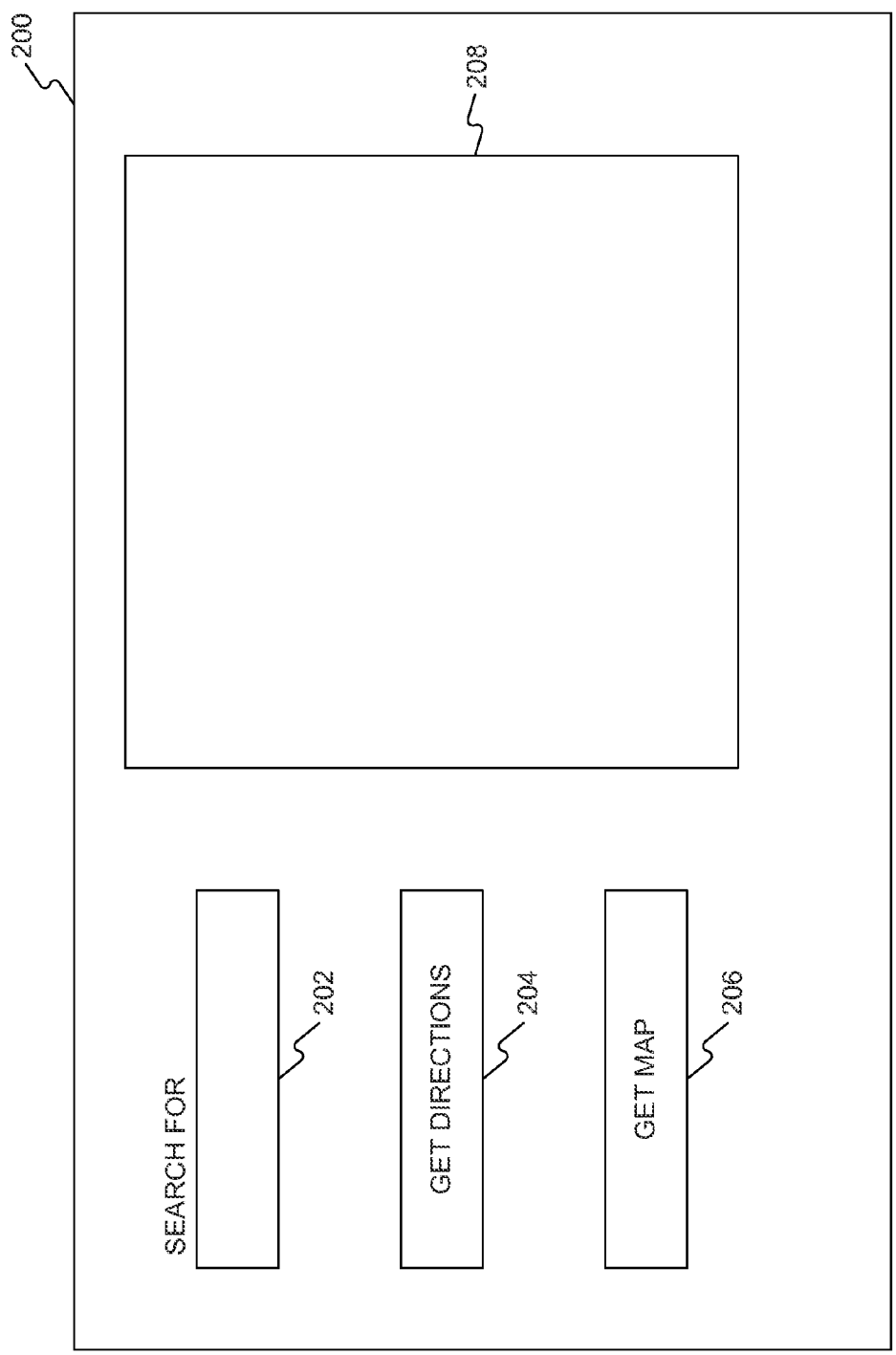
FIG. 2 illustrates an exemplary user interface, consistent with embodiments of the present disclosure.

FIG. 2 illustrates an exemplary interface 200 presented on a display or screen of a user device, in accordance with embodiments of the present disclosure. The exemplary interface 200 may be used to enter a search query for a point of interest or location. For example, a user may enter a query term, as a character string, in search box 202. A listing of probable results, such as probable target addresses, may be displayed in display window 208. Alternatively, display window 208 may display a map. Furthermore, user interface 200 includes respective buttons 204 and 206. In response to a selection of "Get Directions" button 204, a user may be enabled to search for directions from one location to another. Similarly, in response to a selection of "Get Map" button 206, a user may be presented with a map of a particular location or a map associated with directions (e.g., directions from one location to another). One of ordinary skill in the art will appreciate from this disclosure that user interface 200 may contain additional menu items or buttons, which are operative to allow a user to, for example, save, send (e.g., by SMS, MMS, or email), and print a search or a map. Additional functions and display controls (e.g., zoom in or out; navigate up, down, left or right) may also be provided to a user in interface 200, as needed.

Referring again to FIG. 1, in step 104, hierarchically organized data trees are retrieved, from one or more databases or other storage devices, for administrative areas related to the input character string. In accordance with certain embodiments, address and location information may be stored in the hierarchically organized data tree. The hierarchical organized data tree may be a TRIE data structure or a prefix tree, so as to provide an ordered data structure for storing information. The stored information may be comprise or be associated with character strings. As discussed above, utilization of TRIEs allow for quick parsing of data based on inputted prefixes of data strings. An exemplary data tree structure is further described below with reference to the embodiment of FIG. 3.

Figure 3:
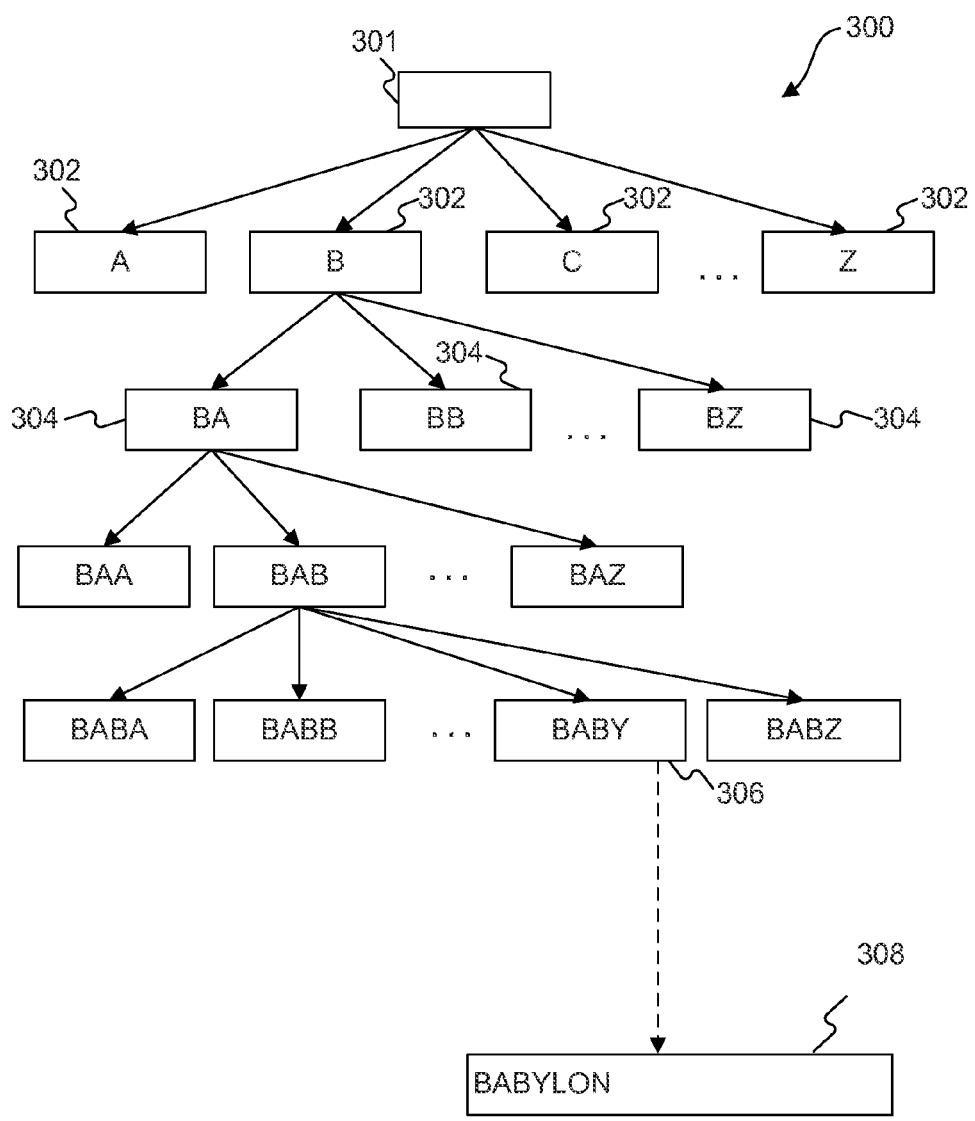
FIG. 3 illustrates an exemplary hierarchically data tree structure, consistent with embodiments of the present disclosure.

FIG. 3 illustrates an exemplary hierarchically organized data tree 300, consistent with embodiments of the present disclosure. Data tree 300 may be implemented as a TRIE structure. As will be apparent from this disclosure, FIG. 3 is provided for purposes of illustration and to assist with an understanding of possible embodiments and uses of hierarchically organized data trees. It is not intended to limit the present disclosure or appended claims.

In the exemplary data tree 300 of FIG. 3, there is a node 302 available for each letter of the alphabet origination from tree root 301. FIG. 3 illustrates an English language character set, but any character set is possible, including character sets in other languages. Each node 302 will connect to a further plurality of available nodes 304. For example, node 302 for "B" connects to a further plurality of available nodes 304 representing "B" plus an additional letter, i.e., "BA"-"BZ". Data tree 300 of FIG. 3 continues in this manner and ultimately connects to node 308 for "BABYLON." In this example, node 308 simply represent a geographic location named "Babylon" including cities, neighborhoods, or counties. Additionally, it may be part of the root of a further designation, such as "Babylon street", "Babylon road", "Babylon circle", and/or various other combinations with "Babylon" as a root.

Data tree 300 may contain nodes for potentially all combination of letters (as illustrated in FIG. 3), but other or similar implementations are also possible. For example, in certain implementations, it may be beneficial to provide a data tree structure that contains nodes that are mapped out to actual locations. For instance, if there are no geographical locations which start with characters "BB", then no such node is created or saved. Additionally, while there may be streets and cities containing "Babylon" in their name, there may be no counties named "Babylon". Accordingly, the data tree structure for counties will not contain a node for Babylon and any additional combinations thereof. However, the respective data tree structures for the streets and cities will.

Based on the characters in an inputted character string, hierarchical data tree structures corresponding with the inputted characters are retrieved for each administrative area under consideration. As noted above, administrative areas may refer to designations with respect to names of countries, islands, sub-continents, cities, counties, states, neighborhoods, subdivisions of neighborhoods, streets, and other well-known geographical designations. For example, New York city contains various neighborhoods including "West Village", "Soho", "Chinatown", and Hell's Kitchen, etc. Furthermore, an administrative area may comprise townships or burrows. For example, New York city can be split into various burrows. Accordingly, in certain embodiments, a hierarchically organized data tree structure may exist for all alphabets for each administrative area. Further, each of the one or more hierarchical organized data tree structures may be organized so that a first character of a possible character string that is mapped out in a respective hierarchically organized data tree structure is represented as a parent node and any subsequent characters in the possible character string are represented as subsequent layers of corresponding child nodes. The stored hierarchically organized data tree structures may be mapped out on the basis of actual addresses and locations. The actual address and locations include names of locales, street addresses, or respective combination of street addresses and city names, city and state names, and other various combinations.

In some embodiments, when a user begins to enter a query term, the entered character string (prefix) may be utilized to retrieve the relevant hierarchically organized data tree structures from one or more databases. An administrative area for which the corresponding hierarchically organized data tree structures exists based on the entered string may be referred to as applicable administrative area. The retrieved data tree structures may be utilized to detect probable target addresses, as described in further detail with respect to step 106 of FIG. 1.

In step 106, probable target addresses for the location are detected using the hierarchically organized data trees for each of the administrative areas. A probable target address may refer to name of a city, county, state, province, neighborhood, etc. It may also refer to street names, street addresses. or respective combination of street addresses and city names, city and state names, and other various combinations.

In accordance with some embodiments, detecting the probable target addresses (step 106) includes determining a corresponding child node, in the hierarchically organized data tree, of a last entered character in the character string. Then, all addresses associated with the corresponding node and associated with any subsequent child nodes of the corresponding node in the respective hierarchically organized data tree are determined to be probable target addresses for a corresponding administrative area. For this example, assume that data tree structure 300 of FIG. 3 is the retrieved hierarchically organized data tree for an administrative area dealing with city names. Thereafter, a user enters the character string "BABY" in search box 202. As discussed previously, "BABY" and specifically character "Y" in this combination is represented by node 306 in data tree 300. Accordingly, the probable target addresses would include node 306 if "Baby" is stored as a city name and any city names stored in any child nodes depending from node 306. For example, Baby may be a name of a city and "Babylon" (node 308) may also be a city name. In this example, data tree 300 may disclose additional probably target addresses, for example, a child node may exist from node 308 representing a city name "Babylonia" (not illustrated in FIG. 3). In some embodiments, the last character entered by a user must correspond to at least one node in data tree structure for the structure to be applicable to the character string. Accordingly, any inputted character string corresponding to an applicable data tree structure must be determined either to itself to be a probable target address or be prefixed to one. While node 308 is illustrated as the last child node in FIG. 3, additional child nodes dependent on node 308 may exist and would then be included as probable target addresses. For example, a city may exist named "Babylonia Bay." Therefore, data tree 300 provides an easy mechanism to determine probable target addresses by utilizing nodes corresponding to the last inputted character.

In additional embodiments, information related to each probable target address may also be stored in the hierarchically organized data structure. This may include, for example, an associated name to be displayed as a result of the search query, an internal database identity number, and/or coordinates of the locations based on latitude and longitude. Such information may also be retrieved along with each probable target address and may be utilized for various functions, including navigation from one point to another. Furthermore, since the data tree structures are organized based on administrative areas, the administrative area type associate with a probable target address may easily be determined and provided to a user. In some embodiments, the internal database identity number is a unique number assigned to each location in a database to allow for efficient way of cataloging characteristics about particular locations.

Referring again to FIG. 1, in step 108, the processor determines a hierarchy of the administrative areas based on data related to a user. Data related to the user may include previous searches, current locations, previous trends, current route context, and meta-data related to communications. For example, if a user's previous searches and subsequent selection of points of interests/locations from the results is indicative of a user preferences for cities, then a city as an administrative area may be given a preference over other administrative areas such counties, or neighborhoods.

In another embodiment, if metadata related to the user indicates that a user is within a threshold distance of a probable target address corresponding to an entered character string, then a type of the administrative area corresponding to the probable target address within the threshold distance may be ranked higher than other administrative areas.

In another embodiment, the administrative areas may be ranked based on a predetermined ranking that is stored along with the TRIE structures. The predetermined ranking may be generated based on various factors including user choice or statistics associated with administrative areas. The statistics may include statistics related to web searches/queries as well as access of websites related to particular administrative areas.

In another embodiment, administrative areas included within bounding boxes may be ranked higher than administrative areas outside the bounding boxes. A bounding box refers to a designation of a geographical area within certain degrees of latitude and longitude. For example, a user's location may be determined utilizing geo-location. Thereafter, a corresponding bounding box (e.g., a bounding box 8 degrees tall in latitude and 16 degrees of longitudinal width or otherwise appropriately sized) may be determined as the relevant bounding box for a user's search. Accordingly, any administrative areas within that bounding box would be ranked higher than administrative areas outside the bounding box. Alternatively, a bounding box may be determined for users based on their general location. For example, a standard bounding box may be designated for all users accessing map data from the states of Maryland and Virginia.

In step 110, a list of probable target addresses is provided based on the hierarchy of the administrative areas. As part of this operation, the list of probably target addresses may be displayed on a device of the user. Various hierarchy schemes may be implemented for the administrative areas. For example, if it is determined that street addresses should be given a higher level of preference compared to city names, then the probable target addresses for street addresses are ranked higher than cities.

Figure 4:
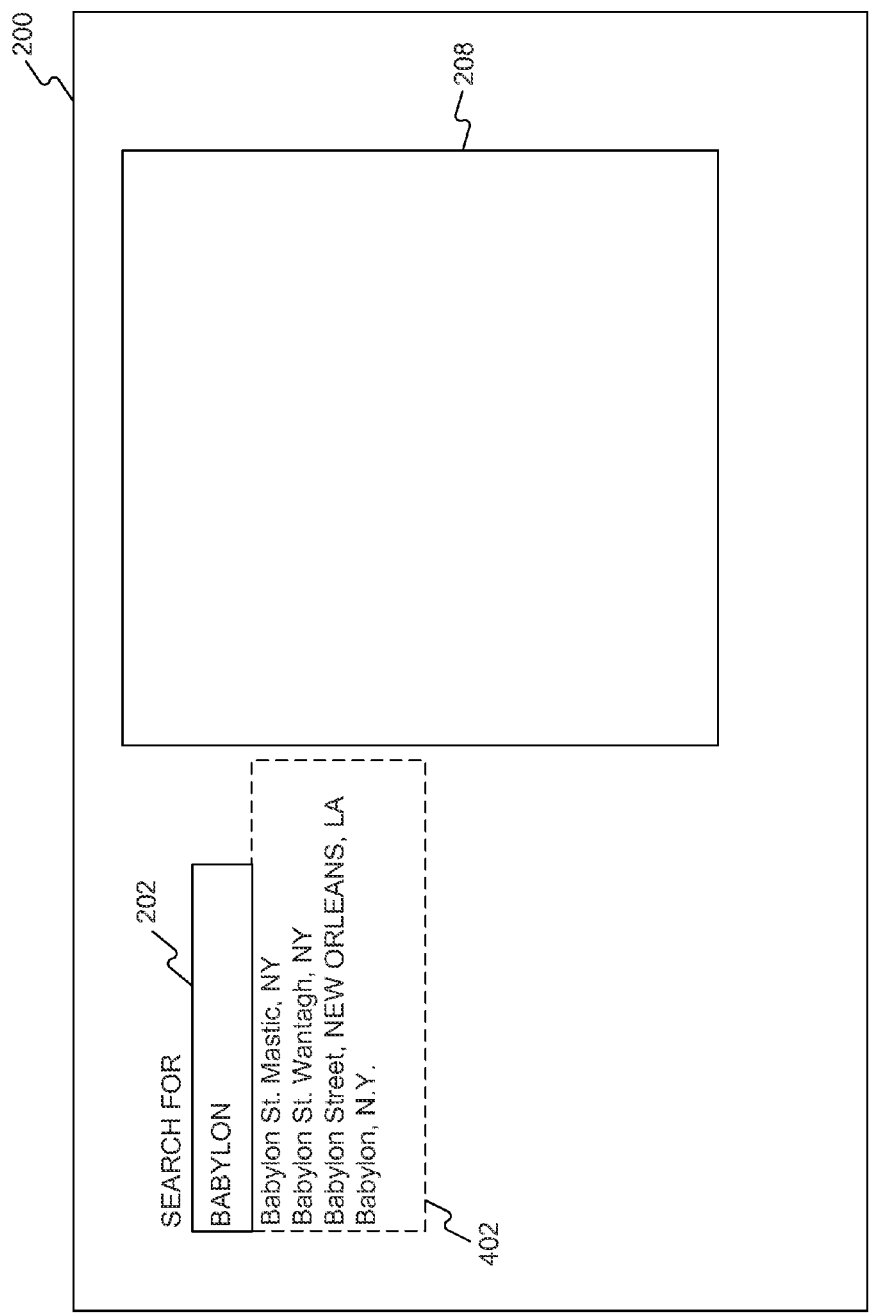
FIG. 4 illustrates another exemplary user interface, consistent with embodiments of the present disclosure.

By way of example, FIG. 4 illustrates an exemplary user interface 200, consistent with embodiments of the present disclosure. The user interface 200 may be presented on a display or screen of a user device and include a search box 202 to allow the entry of a search query, such as "BABY". In response to the search query, a list of probable target addresses is displayed in a pop-up box 402. As can be seen in the pop-up box, the first three displayed entries are related to street addresses, while the last entry "Babylon, N.Y." is related to a city. In this example, it may be assumed that the data tree structure associated with the administrative area of street names contains only three probably target addresses which were the children of node 306. Similar, it may be assumed that the data tree structure associated with the administrative area associated with city names contains only one probably target address which is the children of node 306. Based on the order of the displayed entries in pop-up box 402, it is apparent that an administrative area associated with street names is ranked higher in the hierarchy than an administrative area associated with city names.

In some embodiments, the list of probable target addresses may include a threshold number of probable target addresses for each administrative area. For example, in the list, first three street addresses may be listed, then three city names, then three county names, then three neighborhoods, and so on. The threshold number may be predetermined or selectively set by a user or administrator.

In other embodiments, a first set of probable target addresses may be listed up to a first threshold number of probable target addresses associated with a first applicable administrative area, followed by a second set of probable target addresses up to a second threshold number of probable target addresses associated with a second applicable administrative area. Thereafter, the list of probable target addresses may go on to include additional probable target addresses associated with the first applicable administrative area. Probable target addresses associated with additional applicable administrative areas may be included in an analogous manner to the list without deviating from the principles of the present disclosures.

A user selection of any of the list of probable target addresses from pop-up box 402 will lead to information related to the selected item being displayed or presented in display box 208.

In another embodiment, when it is determined that the input character string includes additional characters after a last possible root of a TRIE structure, the characters after the last possible root of the TRIE structure may be utilized by the system to search for additional administrative areas utilizing additional TRIE structures. This may be performed utilizing a pointer which points to additional predetermined administrative areas or, more specifically, TRIE structures corresponding to additional administrative areas. For example, if "101 Main St. Durham" is the input character string, where "101 Main St." is a street address and "Durham" is a city name, then the TRIE structure dealing with street addresses may indicate that a street address "101 Main St." is represented by the last possible root within that TRIE structure. Accordingly, input of any characters starting with "D" would lead the system to utilize a pointer which points to a TRIE structure associated with city names. Thereafter, the TRIE structure corresponding with city names started with the letter "D" would be utilized. In certain embodiments, the pointers are not included within the TRIE structures but are stored separately. Furthermore, the pointers may comprise general rules applicable to the types of administrative areas, such as street address to cities, cities to counties, instead of dealing with specific TRIE structures.

Figure 5:
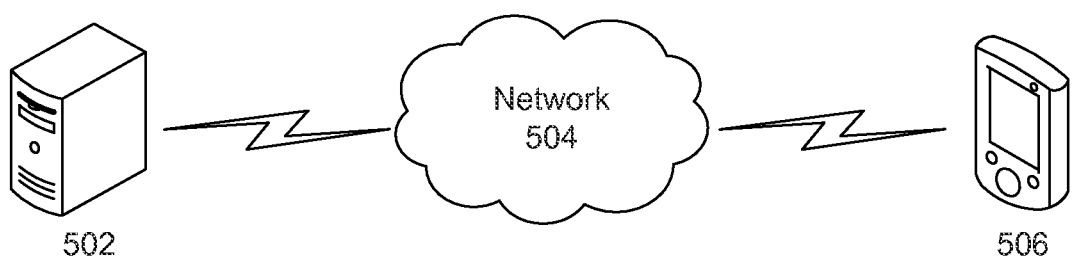
FIG. 5 illustrates an exemplary computing environment for implementing embodiments and features consistent with the present disclosure.

FIG. 5 illustrates an exemplary computing environment 500 for implementing embodiments consistent with the present disclosure. The exemplary computing environment 500 may be utilized to implement embodiments of the present disclosure, including the above-described methods and features.

In computing environment 500, a search provider may provide a computer system 502 that enables search services for geographical locations or points of interests. Computer system 502 may include one or more web servers hosting web pages or software applications that provide for entry of search queries. Computer system 502 may also include back-end servers for processing search queries.

A network 504 may connect computer system 502 with one or more client devices 506. Network 504 may provide for the exchange of information, such as search queries and results, between client devices 506 and computer system 502. Network 504 may include one or more types of networks interconnecting servers 502 with client devices 506. For example, one of client devices 506 may communicate with a computer system 502 over a coaxial cable network, while a different one of client devices 506 may communicate with computer system 502 over a cellular network. Network 504 may include one or more wide area networks (WANs), metropolitan area networks (MANs), local area networks (LANs), or any combination of these networks. Network 504 may include a combination of a variety of different network types and connections, including the Internet, Ethernet, twisted-pair, coaxial cable, fiber optic, cellular, satellite, IEEE 604.11, terrestrial, and/or other types of networks and connections. In some embodiments, network 504 comprises the Internet.

Client devices 506 may include a variety of different types of computing devices capable of communicating with computer system 502 over network 504. These computing devices may include personal computers, laptops, personal digital assistants (PDA), telephones, televisions, set-top boxes, mobile phones, smart-phones, tablet computers, servers, and/or other types of computing devices. A user may use more than one type of client device to communicate with computer system 502. As will be appreciated from this disclosure, the steps of method 100 (FIG. 1) may be performed in computing device 502 or client device 506. For example, when all or part of method 100 is performed in computing device 502, in step 102, data may be received by a processor of computing device 502 regarding an input in client device 506. Similarly, when all or part of method 100 is performed in client device 506, in step 102, data may be received by a processor of client device 506 indicating an input of a character string by a user in the client device 506, based on which in step 104, a processor in client device 506 may retrieve hierarchically organized data trees, for example, from storage databases in computing device 502 or other sources connected to network 504. The retrieving by the client device 506 may include sending a request for hierarchically organized data trees and receiving the hierarchically organized data tree. Thereafter, steps 106 through 110 may be implemented in client device 506.

Figure 6:
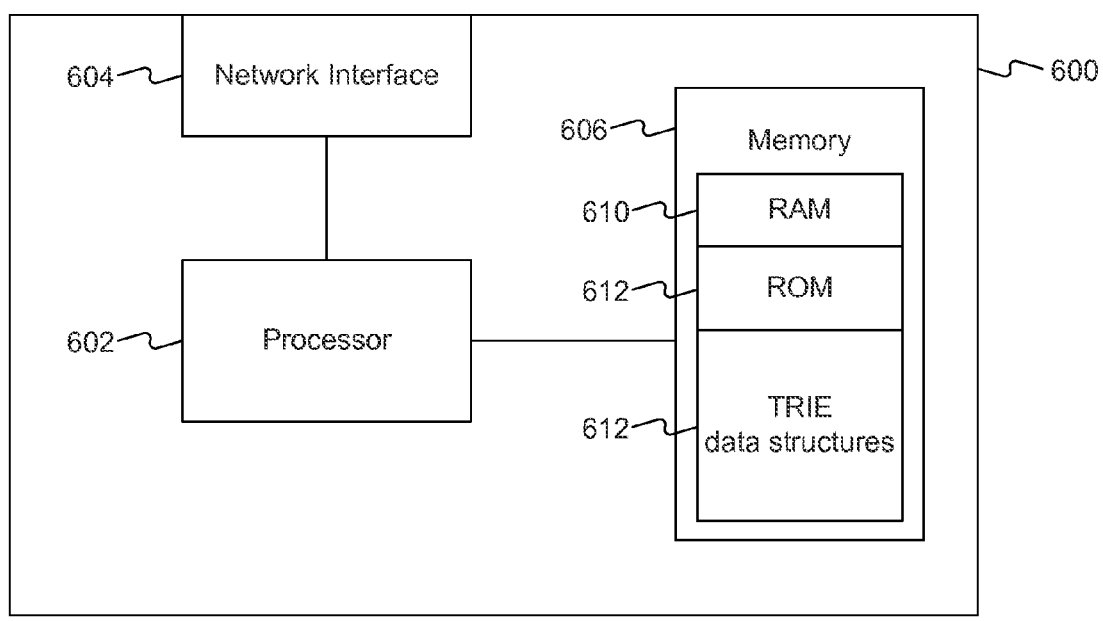
FIG. 6 illustrates an exemplary computer system for implementing embodiments and features consistent with the present disclosure.

FIG. 6 is illustrates an exemplary computer system 502 that may be used for implementing embodiments consistent with the present disclosure, including the exemplary systems and methods described herein. Computer system 502 may include one or more computers 600, which may be servers, personal computers, and/or other types of computing devices. A computer 600 may include one or more processors 602 that may be any suitable type of processor. Processor 602 may be coupled to a network interface 604 for receiving and/or transmitting data and/or commands to/from other devices over a variety of networks, such as the Internet, Ethernet, twisted-pair, coaxial cable, fiber optic, cellular, satellite, IEEE 604.11, terrestrial, or other wired or wireless networks.

Processor 602 may be coupled to a memory device 606. Memory device 606 may be configured to store instructions that, when executed by one or more processors 602, carry out the methods and techniques consistent with the present disclosure, including the exemplary methods and techniques described herein. Memory device 606 may also store an operating system, software applications, and/or parameters. Data stored on memory device 606 may be stored in a single dedicated memory, or over a plurality of memory devices. Memory device 606 may include any type of memory, physical, non-transient, volatile, or non-volatile, including, but not limited to, random access memory (RAM) 610, read-only memory (ROM) 612, magnetic strip storage, semiconductor storage, optical disc storage, and/or magneto-optical disc storage.

Memory device 606 may also include one or more databases 608 for storing hierarchically organized data trees of locations or addresses, and/or any other information or data stored as a result of the performing the disclosed methods, or required to perform the disclosed methods. Databases 608 may also store additional information such as coordinates corresponding to a location, as disclosed herein. Processor 602 may also be coupled to a computer providing a user interface for allowing input of information and commands to processor 602 and/or for allowing output of information and commands in a human-readable form.

As disclosed herein, search query records may be analyzed to determine a character string that is input. The inputted character string is utilized to retrieve data tree structures from databases which aid in determining probable target addresses. A user's previous query searches or behavior relations to selection from a list of probable target addresses may be stored and used by computer system 502 for a variety of purposes, including determining a hierarchy of administrative areas. For example, if a user's previous behavior indicates a user generally selects city names from a list of probably target addresses, then the administrative area of city names may be ranked higher than the rest of the administrative areas.

Accordingly, the disclosed systems and methods provide a useful way of providing a list of probable target addresses even before a search query term related to a target address is complete. Since users have to come to expect more efficiency in the user of their time and energy, the ability to accurately predict probable target addresses when only partial information has been entered relating to a desired location by using hierarchically organized data trees or TRIE structures allows for an efficient searching mechanism that saves a user time and effort.

The many features and advantages of the disclosure are apparent from the detailed specification, and, thus, it is intended that the appended claims cover all systems and methods, which fall within the true spirit and scope of the disclosure. As used herein, the indefinite articles "a" and "an" mean "one or more" in open-ended claims containing the transitional phrase "comprising," "including," and/or "having." Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A computer-implemented method for generating results of a search query, comprising:
   receiving data indicative of a character string related to a location, the character string being provided as input from a user;
   retrieving, from a storage device, one or more hierarchically organized data trees of locations related to the character string, each of the one or more hierarchically organized data trees corresponding to a type of geographical designation, each of the one or more hierarchically organized data trees being organized so that a first character of a possible character string that is mapped out in a respective hierarchically organized data tree is represented as a parent node and any subsequent characters in the possible character string that is mapped out in the respective hierarchically organized data tree are represented as subsequent corresponding child nodes;
   detecting probable target addresses for the location using the hierarchically organized data trees for each of the types of geographical designations by:
      determining a corresponding node, in the respective hierarchically organized data tree, of a last entered character in the character string, and
      determining that all addresses associated with the corresponding node and associated with any subsequent child nodes of the corresponding node in the respective hierarchically organized data tree are probable target addresses for a corresponding type of geographical designation;
   determining, by at least one processor, a hierarchy of the types of geographical designations based on data related to a user; and
   providing, on a display of a device of the user, a list of probable target addresses based on the hierarchy of the types of geographical designations.

2. The computer-implemented method of claim 1, wherein receiving data indicative of the character string comprises receiving data responsive to each new character being provided as input by the user.

3. The computer-implemented method of claim 1, wherein the one or more hierarchically organized data trees comprise TRIE data structures that store addresses corresponding to locations.

4. The computer-implemented method of claim 1, wherein providing the list of probable target addresses based on the hierarchy of the types of geographical designations comprises providing probably target addresses related to a higher ranked type of geographical designation before probable target addresses related to the lower ranked type of geographical designation.

5. The computer-implemented method of claim 1, further comprising:
   providing additional associated information with each probable target address included in the probable target addresses, the additional associated information comprising one or more of an associated name to be displayed, an internal database identity number, and coordinates with respect to latitude and longitude.

6. The computer-implemented method of claim 1, wherein the types of geographical designations comprise: country, state, city, county, neighborhood. subdivision, and street.

7. A computer system for generating results of a search query, comprising:
   a memory device that stores a set of instructions; and
   at least one processor that executes the set of instructions and is configured to:
      receive data indicative of input of a character string related to a location;
      retrieve hierarchically organized data trees of locations related to the character string, each of the one or more hierarchically organized data trees corresponding to a type of geographical designation, each of the one or more hierarchically organized data trees being organized so that a first character of a possible character string that is mapped out in a respective hierarchically organized data tree is represented as a parent node and any subsequent characters in the possible character string that is mapped out in the respective hierarchically organized data tree are represented as subsequent corresponding child nodes;
      detect probable target addresses for the location using the hierarchically organized data trees for each of the types of geographical designations by:
         determine a corresponding node, in the respective hierarchically organized data tree, of a last entered character in the character string, and
         determine that all addresses associated with the corresponding node and associated with any subsequent child nodes of the corresponding node in the respective hierarchically organized data tree are probable target addresses for a corresponding type of geographical designation;
      determine a hierarchy of the types of geographical designations based on data related to a user; and
      provide a list of probable target addresses based on the hierarchy of the types of geographical designations to display on a device of the user.

8. The computer system of claim 7, wherein receive data indicative of input of the character string comprises receive data responsive to each new character being input by the user.

9. The computer system of claim 7, wherein each of the one or more hierarchically organized data trees is organized so that a first character of a possible character string that is mapped out in a respective hierarchically organized data tree is represented as a parent node and any subsequent characters in the possible character string that is mapped out in the respective hierarchically organized data tree are represented as subsequent corresponding child nodes.

10. The computer system of claim 7, wherein the types of geographical designations comprise: country, state, city, county, neighborhood, subdivision, and street.

11. The computer system of claim 9, wherein to detect probable target addresses for the location using the hierarchically organized data trees for each of the types of geographical designations, the processor is further configured to:
   determine a corresponding node, in the respective hierarchically organized data tree, of a last entered character in the character string; and
   determine that all addresses associated with the corresponding node and associated with any subsequent child nodes of the corresponding node in the respective hierarchically organized data tree are probable target addresses for a corresponding type of geographical designation.

12. The computer system of claim 9, wherein to provide the list of probable target addresses based on the hierarchy of the types of geographical designations, the processor is further configured to provide probable target addresses related to a higher ranked type of geographical designation before probable target addresses related to the lower ranked type of geographical designation.

13. A non-transitory computer-readable medium that stores a set of instructions that, when executed by at least one processor, configures the at least one processor to carry out a method, the method comprising:
receiving data indicative of a character string related to a location, the character string being provided as input by a user;
retrieving, from a storage device, one or more hierarchically organized data trees of locations related to the character string, each of the one or more hierarchically organized data trees corresponding to a type of geographical designation, each of the one or more hierarchically organized data trees being organized so that a first character of a possible character string that is mapped out in a respective hierarchically organized data tree is represented as a parent node and any subsequent characters in the possible character string that is mapped out in the respective hierarchically organized data tree are represented as subsequent corresponding child nodes;
detecting probable target addresses for the location using the hierarchically organized data trees for each of the types of geographical designations by:
determining a corresponding node, in the respective hierarchically organized data tree, of a last entered character in the character string, and
determining that all addresses associated with the corresponding node and associated with any subsequent child nodes of the corresponding node in the respective hierarchically organized data tree are probable target addresses for a corresponding type of geographical designation;
determining a hierarchy of the types of geographical designations based on data related to a user; and
providing, on a display of a device of the user, a list of probable target addresses based on the hierarchy of the types of geographical designations.

14. The computer-readable medium of claim 13, wherein receiving data indicative of input of the character string comprises receiving data responsive to each new character being input by the user.

15. The computer-readable medium of claim 13, wherein the set of instructions further configure the at least one processor to:
provide probably target addresses related to a higher ranked type of geographical designation before probable target addresses related to the lower ranked type of geographical designation.

16. The computer-readable medium of claim 13, wherein the types of geographical designations comprise: country, state, city, county, neighborhood, subdivision, and street.

* * * * *